(12) United States Patent
Baier et al.

(10) Patent No.: US 7,882,218 B2
(45) Date of Patent: Feb. 1, 2011

(54) PLATFORM INDEPENDENT HISTORIAN

(75) Inventors: John J. Baier, Mentor, OH (US); Taryl J. Jasper, South Euclid, OH (US); John T. Campbell, Bridgeville, PA (US); Robert J. McGreevy, Oswego, IL (US); Frank Anthony Palmieri, Jr., Gibsonia, PA (US); Robert J. Herbst, Aurora, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 560 days.

(21) Appl. No.: 11/863,216

(22) Filed: Sep. 27, 2007

(65) Prior Publication Data

US 2009/0089695 A1 Apr. 2, 2009

(51) Int. Cl.
*G06F 13/00* (2006.01)
(52) U.S. Cl. ...................................... 709/224
(58) Field of Classification Search .................. 709/224
See application file for complete search history.

(56) References Cited

U.S. PATENT DOCUMENTS

| | | | |
|---|---|---|---|
| 4,510,565 A | 4/1985 | Dummermuth | |
| 4,553,205 A | 11/1985 | Porchia | |
| 4,616,333 A | 10/1986 | Shimoni | |
| 4,718,025 A | 1/1988 | Minor et al. | |
| 4,731,735 A | 3/1988 | Borgendale et al. | |
| 4,773,028 A | 9/1988 | Tallman | |
| 4,831,529 A | 5/1989 | Miike et al. | |
| 4,975,865 A | 12/1990 | Carette et al. | |
| 5,003,469 A | 3/1991 | Kamiyama et al. | |
| 5,051,932 A | 9/1991 | Inove et al. | |
| 5,274,781 A | 12/1993 | Gibart | |
| 5,452,201 A | 9/1995 | Pieronek et al. | |
| 5,568,383 A | 10/1996 | Johnson et al. | |
| 5,805,442 A | 9/1998 | Crater et al. | |
| 5,901,323 A | 5/1999 | Milliken et al. | |
| 5,943,675 A | 8/1999 | Keith et al. | |
| 5,991,793 A | 11/1999 | Mukaida et al. | |

(Continued)

FOREIGN PATENT DOCUMENTS

EP 0490864 6/1992

(Continued)

OTHER PUBLICATIONS

"Major Canadian Natural Gas Producer Buys AnyWhere/AnyTime Services from Industrial Evolution" Mar. 12, 2001, Industrial Evolution pp. 1.

(Continued)

*Primary Examiner*—Robert B Harrell
(74) *Attorney, Agent, or Firm*—Turocy & Watson LLP; William R. Walbrun; John M. Miller

(57) ABSTRACT

Systems and methods that provide for historians communicating in a plurality of protocols/languages with various resources via employing an abstraction component that normalizes such communication. Accordingly, the historian can supply a common configuration for various data (e.g., events, command, event, alarm, scenarios, transactions, messages, and the like), and hence provide support for third party devices. The abstraction component can further facilitate: Filtering, Bridging, Routing, Propagation, Transformation and Monitoring of data exchange with third party devices.

20 Claims, 11 Drawing Sheets

U.S. PATENT DOCUMENTS

| | | | |
|---|---|---|---|
| 6,092,036 | A | 7/2000 | Hamann |
| 6,110,214 | A | 8/2000 | Klimasauskas |
| 6,139,201 | A | 10/2000 | Carbonell et al. |
| 6,198,480 | B1 | 3/2001 | Cotugno et al. |
| 6,204,782 | B1 | 3/2001 | Gonzalez et al. |
| 6,219,649 | B1 | 4/2001 | Jameson |
| 6,233,623 | B1 | 5/2001 | Jeffords et al. |
| 6,252,589 | B1 | 6/2001 | Rettig et al. |
| 6,263,487 | B1 | 7/2001 | Stripf et al. |
| 6,298,393 | B1 | 10/2001 | Hopsecger |
| 6,298,454 | B1 | 10/2001 | Schleiss et al. |
| 6,385,496 | B1 | 5/2002 | Irwin et al. |
| 6,411,987 | B1 | 6/2002 | Steger et al. |
| 6,505,247 | B1 | 1/2003 | Steger et al. |
| 6,536,029 | B1 | 3/2003 | Boggs et al. |
| 6,539,271 | B2 | 3/2003 | Lech et al. |
| 6,559,861 | B1 | 5/2003 | Kennelly et al. |
| 6,574,639 | B2 | 6/2003 | Carey et al. |
| 6,618,856 | B2 | 9/2003 | Coburn et al. |
| 6,633,782 | B1 | 10/2003 | Schleiss et al. |
| 6,701,324 | B1 | 3/2004 | Cochran et al. |
| 6,754,668 | B2 | 6/2004 | Noble et al. |
| 6,754,885 | B1 | 6/2004 | Dardinski et al. |
| 6,766,214 | B1 | 7/2004 | Wang et al. |
| 6,795,798 | B2 | 9/2004 | Eryurek et al. |
| 6,799,148 | B2 | 9/2004 | Ling et al. |
| 6,847,850 | B2 | 1/2005 | Grumelart |
| 6,847,854 | B2 | 1/2005 | Discenzo |
| 6,865,644 | B2 | 3/2005 | Husted et al. |
| 6,952,727 | B1 | 10/2005 | Lindner et al. |
| 6,975,913 | B2 | 12/2005 | Kreidler et al. |
| 7,043,311 | B2 | 5/2006 | Nixon et al. |
| 7,050,873 | B1 | 5/2006 | Discenzo |
| 7,069,201 | B1 | 6/2006 | Lindner et al. |
| 7,152,222 | B2 | 12/2006 | Kumhyr et al. |
| 7,181,370 | B2 | 2/2007 | Furem et al. |
| 7,206,646 | B2 | 4/2007 | Nixon et al. |
| 7,206,965 | B2 | 4/2007 | Roddy et al. |
| 7,218,974 | B2 | 5/2007 | Rumi et al. |
| 7,228,310 | B2 | 6/2007 | O'Brien |
| 7,249,356 | B1 | 7/2007 | Wilson et al. |
| 7,272,665 | B2 | 9/2007 | Yamada et al. |
| 7,275,062 | B2 | 9/2007 | Deitz et al. |
| 7,286,888 | B2 | 10/2007 | Monette et al. |
| 7,299,367 | B2 | 11/2007 | Hamm et al. |
| 7,328,078 | B2 | 2/2008 | Sanford et al. |
| 7,359,930 | B2 | 4/2008 | Jackson et al. |
| 7,406,453 | B2 | 7/2008 | Mundie et al. |
| 7,574,417 | B1 | 8/2009 | McGreevy et al. |
| 7,584,216 | B2 | 9/2009 | Travieso et al. |
| 7,616,095 | B2 | 11/2009 | Jones et al. |
| 7,627,385 | B2 | 12/2009 | McGreevy et al. |
| 7,684,876 | B2 | 3/2010 | Grgic |
| 7,693,585 | B2 | 4/2010 | Kalan et al. |
| 7,742,833 | B1 | 6/2010 | Herbst et al. |
| 2002/0019839 | A1 | 2/2002 | Shiu |
| 2002/0069235 | A1 | 6/2002 | Chen |
| 2002/0120744 | A1 | 8/2002 | Chellis et al. |
| 2002/0133523 | A1 | 9/2002 | Ambler et al. |
| 2002/0169907 | A1 | 11/2002 | Candea et al. |
| 2002/0174263 | A1 | 11/2002 | Codd et al. |
| 2002/0184601 | A1 | 12/2002 | Fitzhenry et al. |
| 2002/0184610 | A1 | 12/2002 | Chong et al. |
| 2003/0014130 | A1 | 1/2003 | Grumelart |
| 2003/0041135 | A1 | 2/2003 | Keyes et al. |
| 2003/0100958 | A1 | 5/2003 | Cachat et al. |
| 2003/0101208 | A1 | 5/2003 | Chauvel et al. |
| 2003/0130899 | A1 | 7/2003 | Ferguson et al. |
| 2003/0172107 | A1 | 9/2003 | Leyfer et al. |
| 2003/0182303 | A1 | 9/2003 | Gibson |
| 2004/0153437 | A1 | 8/2004 | Buchan |
| 2004/0181294 | A1 | 9/2004 | Deitz et al. |
| 2004/0225649 | A1 | 11/2004 | Yeo et al. |
| 2005/0071755 | A1 | 3/2005 | Harrington et al. |
| 2005/0085928 | A1 | 4/2005 | Shani |
| 2005/0198034 | A1 | 9/2005 | Boyer |
| 2005/0198406 | A1 | 9/2005 | Sichner |
| 2005/0203648 | A1 | 9/2005 | Martin |
| 2005/0210337 | A1 | 9/2005 | Chester et al. |
| 2006/0004827 | A1 | 1/2006 | Stuart |
| 2006/0020928 | A1 | 1/2006 | Holloway et al. |
| 2006/0026559 | A1 | 2/2006 | Gunturi et al. |
| 2006/0067334 | A1 | 3/2006 | Ougarov et al. |
| 2006/0161268 | A1 | 7/2006 | Frensch et al. |
| 2006/0259160 | A1 | 11/2006 | Hood et al. |
| 2006/0291283 | A1 | 12/2006 | Jin et al. |
| 2006/0294502 | A1 | 12/2006 | Das et al. |
| 2007/0006039 | A1 | 1/2007 | Fichter et al. |
| 2007/0027913 | A1 | 2/2007 | Jensen et al. |
| 2007/0028070 | A1 | 2/2007 | Avergun et al. |
| 2007/0038610 | A1 | 2/2007 | Omoigui |
| 2007/0050348 | A1 | 3/2007 | Aharoni et al. |
| 2007/0073744 | A1 | 3/2007 | McVeigh et al. |
| 2007/0112447 | A1 | 5/2007 | McGreevy et al. |
| 2007/0112801 | A1 | 5/2007 | McGreevy et al. |
| 2007/0136533 | A1 | 6/2007 | Church et al. |
| 2007/0142941 | A1 | 6/2007 | McGreevy et al. |
| 2007/0156770 | A1 | 7/2007 | Espelien |
| 2007/0244964 | A1 | 10/2007 | Challenger et al. |
| 2007/0282577 | A1 | 12/2007 | Lind |
| 2007/0288795 | A1 | 12/2007 | Leung et al. |
| 2007/0294078 | A1 | 12/2007 | Kim et al. |
| 2008/0027678 | A1 | 1/2008 | Miller |
| 2008/0082577 | A1 | 4/2008 | Hood et al. |
| 2008/0126408 | A1 | 5/2008 | Middleton |
| 2008/0313228 | A1 | 12/2008 | Clark et al. |

FOREIGN PATENT DOCUMENTS

| | | |
|---|---|---|
| EP | 1109107 | 6/2001 |
| EP | 1307823 | 5/2003 |
| GB | 2347234 | 8/2000 |
| GB | 2353616 A1 | 2/2001 |
| WO | 2004027531 A1 | 4/2004 |
| WO | 2005006130 A2 | 1/2005 |
| WO | 2005006130 A3 | 1/2005 |

OTHER PUBLICATIONS

Real Time Intelligence at the Source-Deploying and EMbedded Historian. Users Conference 2005, pp. 1.

Miller, et al. "Extending the Reach of Enterprise Data Management in a World of M2M." ISA Expo. Oct. 2005, pp. 1-7.

"Proficy Historian"; Dec. 16, 2004, Ge Fanuc, pp. 1-8.

European Search Report dated Feb. 22, 2008 for European Patent Application Serial No. EP 07 11 7388, 1 Page.

European Search Report dated Jan. 20, 2009 for European Patent Application No. EP08156281, 6 Pages.

EP Office Action for Application No. 08165215.8-1243 dated Mar. 3, 2009, 2 pages.

European Search Report and Written Opinion for European Application No. EP 08 16 5215, dated Dec. 8, 2008, 6 pages.

Sakharov. Macro-Processing in High-Level Languages. ACM Sigplan Notices, vol. 27, No. 11, Nov. 1, 1992, pp. 59-66, XP000328425, ISSN: 0362-1340. Last accessed Jan. 20, 2009, 18 pages.

Cardoso, et al. Macro-Based Hardware Compilation of Java (TM) Bytecodes Into a Dynamic Reconfigurable Computing System, Apr. 21, 1999. In IEEE Seventh Symposium on Field Programmable Custom Computing Machines, (FCCM'99). Napa Valley, California, Apr. 21-23, 1999. http://citeseerx.ist.psu.edu/viewdoc/summary?doi=10.1.1.41.8292. Last accessed Jan. 21, 2008, 10 pages.

European Search Report dated Feb. 5, 2008 for European Patent Application No. EP07117614, 8 pgs.

Alvestrand. "Tags for the Identification of Languages: rfc 1766. txt," Internet Engineering Task Force, Mar. 1995, XP015007553, ISSN: 0000-0003. ftp://ftp.isi.edu/in-notes/rfc1766.txt. Last accessed Jun. 6, 2008, 9 pages.

European Search Report dated May 2, 2008 for European Patent Application No. EP07117622, 3 pgs.

Power Rich System, Enterprise Edition, Historian (PRS EE Historian) Version 1.5, last accessed Dec. 3, 2008, 15 pages.

Wonderware Plant Intellingence Solution Helps Arla Foods Deliver Fresh Milk Products to the Tables of Europe. Last accessed Dec. 3, 2008, 4 pages.

European Search Report dated Dec. 18, 2007 for European Patent Application Serial No. 07117364.5-2221, 2 Pages.

OA dated Dec. 18, 2008 for U.S. Appl. No. 11/536,522, 15 pages.
OA dated Apr. 3, 2009 for U.S. Appl. No. 11/536,522, 20 pages.
OA dated Jul. 21, 2008 for U.S. Appl. No. 11/536,522, 21 pages.
OA dated Oct. 13, 2009 for U.S. Appl. No. 11/536,522, 22 pages.
OA dated Sep. 16, 2009 for U.S. Appl. No. 11/558,705, 23 pages.
OA dated Apr. 22, 2009 for U.S. Appl. No. 11/558,705, 23 pages.
OA dated Jul. 29, 2009 for U.S. Appl. No. 11/558,710, 18 pages.
OA dated Nov. 14, 2008 for U.S. Appl. No. 11/558,710, 18 pages.
OA dated Jul. 28, 2008 for U.S. Appl. No. 11/536,545, 26 pages.
OA dated Dec. 12, 2008 for U.S. Appl. No. 11/536,545, 18 pages.
OA dated Jul. 10, 2009 for U.S. Appl. No. 11/536,545, 30 pages.
OA dated Jan. 26, 2009 for U.S. Appl. No. 11/536,535, 40 pages.
OA dated Jul. 23, 2008 for U.S. Appl. No. 11/536,535, 31 pages.
OA dated Dec. 3, 2008 for U.S. Appl. No. 11/536,566, 35 pages.
OA dated Jan. 4, 2010 for U.S. Appl. No. 11/558,710, 37 pages.
CNOA Due Dec. 29, 2008 for Chinese Patent Application No. 200710162327.9, 6 pages.
OA dated Mar. 30, 2010 for U.S. Appl. No. 11/558,705, 44 pages.
OA dated Mar. 24, 2010 for U.S. Appl. No. 11/750,193, 36 pages.

Uraikul, et al. "Artificial Intelligence for Monitoring and Supervisory Control of Process Systems." Nov. 30, 2006, Engineering Applications of Artificial Intelligence, Pineridge Press, Swansea, GB, pp. 115-131, XP005786108, ISSN: 0957-1976.

European Search Report dated Mar. 25, 2010 for European Patent Application No. EP 07 12 0362, 6 pages.

"High Level Triggers, Data Acquisition and Controls." Atlas Technical Design Report, Jun. 30, 2003, pp. 1-370, XP002570453, Chapters 1-7, 9, 11, 13. http://cdsweb.cern.ch/record/616089/files/cer-002375189.pdf. Last accessed Apr. 1, 2010, 196 pages.

Vermeulen, et al. "Atlas Dataflow: the Read-Out Subsystem, Results from Trigger and Data Acquisition System Testbed Studies and from Modeling." 14th IEEE—NPSS Real time Conference, Stockholm, Sweden, Jun. 4-10, 2005, pp. 270-274, XP010859081, ISBN: 978-0-7803-9183-3.

Gameiro, et al. "The ROD Crate DAQ of the Atlas Data Acquisition System." 14th IEEE—NPSS Real time Conference, Stockholm, Sweden, Jun. 4-10, 2005, pp. 527-531, XP010859117, ISBN: 978-0-7803-9183-3.

European Search Report dated Mar. 25, 2010 for European Patent Application No. EP 07 12 0357, 5 pages.

Charbonnier, et al. "Trends Extraction and Analysis for Complex System Monitoring and Decision Support." Feb. 1, 2005, Engineering Applications of Artificial Intelligence, Pineridge Press, Swansea, GB, pp. 21-36, XP025299588, ISSN: 0952-1976.

European Search Report dated Mar. 10, 2010 for European Application Serial No. EP 08 16 4957, 7 pages.

OA dated Jun. 25, 2010 for U.S. Appl. No. 11/862,182, 41 pages.
OA dated May 27, 2010 for U.S. Appl. No. 11/537,110, 77 pages.
OA dated Jun. 11, 2010 for U.S. Appl. No. 11/862,180, 27 pages.

A new general purpose compression method for searching in large collection, Bhadade, U.S.; Sharma, V.K.; Trivedi, A. I.; TENCON 2007-2007 IEEE Region 10 Conference Digital Object Identifier: 10.11 09ITENCON.2007.4428935. Publication Year: 2007 , pp. 1-4.

Input Data Representation for Self-Organizing Map in Software Classification, Yuqing Lin; Huilin Ye; Knowledge Acquisition and Modeling, 2009. KAM '09. Second International Symposium on vol. 2 Digital Object Identifier: 10.11 09/KAM2009.151, Publication Year: 2009 , pp. 350-353.

Supervised and Traditional Term Weighting Methods for Automatic Text Categorization, Man Lan; Chew Lim Tan; Jian Su; Yue Lu; Pattern Analysis and Machine Intelligence, IEEE Transactions on vol. 31 , Issue: 4. Digital Object Identifier: 10.11 09/TPAMI.2008.11 0 Publication Year: 2009 , pp. 721-735.

Selecting predicate logic for knowledge representation by comparative study of knowledge representation schemes, Ali, A.; Khan, M.A.; Emerging Technologies, 2009. ICET 2009. International Conference on Digital Object Identifier: 10.11 09/ICET.2009.5353207 Publication Year: 2009 , pp. 23-28.

Notice of Allowance dated Jun. 13, 2010 for U.S. Appl. No. 11/862,891, 49 pages.

OA dated Jul. 22, 2010 for U.S. Appl. No. 11/862,183, 39 pages.
OA dated Jul. 8, 2010 for U.S. Appl. No. 11/558,710, 28 pages.
OA dated Jul. 23, 2010 for U.S. Appl. No. 11/536,550, 51 pages.
OA dated Aug. 23, 2010 for U.S. Appl. No. 11/558,705, 44 pages.
OA dated Sep. 17, 2010 for U.S. Appl. No. 11/864,634, 43 pages.
OA dated Oct. 14, 2010 for U.S. Appl. No. 11/862,861, 43 pages.
OA dated Sep. 3, 2010 for U.S. Appl. No. 11/750,193, 68 pages.
Notice of Allowance for U.S. Appl. No. 11/537,110 dated Nov. 9, 2010, 38 pages.

European Search Report for EP Application No. 08165051.7 dated Oct. 22, 2010, 10 pages.

Non-Final Office Action for U.S. Appl. No. 12/783,229 dated Nov. 19, 2010, 41 pages.

PLATFORM INDEPENDENT HISTORIAN

TECHNICAL FIELD

The subject invention relates generally to historians associated with industrial controllers and more particularly to historians' communication in a plurality of protocols/languages with various resources and industrial units.

BACKGROUND

Industrial controllers are special-purpose computers utilized for controlling industrial processes, manufacturing equipment, and other factory automation, such as data collection or networked systems. At the core of the industrial control system, is a logic processor such as a Programmable Logic Controller (PLC) or PC-based controller. Programmable Logic Controllers for instance, are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. Differences in PLCs are typically dependent on the number of Input/Output (I/O) they can process, amount of memory, number and type of instructions, and speed of the PLC central processing unit (CPU).

In a more macro sense than the controller, businesses have become more complex in that higher order business systems or computers often need to exchange data with such controllers. For instance, an industrial automation enterprise may include several plants in different locations. Modern drivers such as efficiency and productivity improvement, and cost-reduction, are requiring manufacturers to collect, analyze, and optimize data and metrics from global manufacturing sites. For example, a food company can have several plants located across the globe for producing a certain brand of food. These factories in the past were standalone, with minimum data collection and comparison of metrics with other similar factories. In the networked world of today, manufacturers are demanding real-time data from their factories to drive optimization and productivity. Unfortunately, conventional control systems architectures are not equipped to allow a seamless exchange of data between these various components of the enterprise.

Another requirement of modern control system architectures is the ability to record and store data in order to maintain compliance with administrative regulations. One common solution for recording data includes providing a local recording module that often occupies a slot in a controller backplane such as a PC-Historian which is an industrial computer for the controller backplane, and employs a transitional layer to supply an indirect interface to the controller. This includes a platform that provides high speed, time series, data storage and retrieval with both local and remote control processors. The PC-Historian communicates with controllers directly through the backplane and can communicate remotely via a network interface. The PC-Historian allows archiving data from the controller to an Archive Engine which provides additional storage capabilities.

Moreover, control modules can be spatially distributed along a common communication link in several locations, wherein such controllers can then communicate with each other, and/or with historians or applications outside of a control environment (e.g., data collection systems/business related systems and applications). Accordingly, information management, such as message exchanges that employ different protocols and configurations are becoming complex. For example, the mapping of information from production management to process control and custom glue code for integrating systems with different protocols and formats can create configuration and management difficulties.

Furthermore, failed communications (e.g., messages that are not received or acted upon), delayed responses (e.g., as a function of the time difference between a sent message and a re-send), and additional overhead (e.g., consumption of processing cycles to review stored notifications, schedule re-transmissions and re-send messages) further add to the problems involved.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

The subject innovation provides for historians that can communicate in a plurality of protocols/languages with various resources via employing an abstraction component that normalizes such communication. Accordingly, the historian can supply a common configuration for various data (e.g., events, command, event, alarm, scenarios, transactions, messages, and the like), and hence provide support for third party devices. The abstraction component can further facilitate: Filtering, Bridging, Routing, Propagation, Transformation and Monitoring of data exchange with third party devices. Moreover, such can facilitate a unification of various protocols/networks, which can further bind device models (e.g., device specific applications that communicate with the device) or services, and also higher level protocols to multiple historian network implementations. As part of such an abstraction, programming models can be implemented that include semantics for a locator component, and a messaging transport component.

The locator component can permit devices attached to a network, to provide a signaling mechanism for a discovery of such devices. In addition, the messaging transport component can provide for the ability to transfer messages, such as control messages of medium priority that typically are required to transfer rapidly to maintain a substantially good control of the various devices. Accordingly, the subject innovation can facilitate interaction between applications of industrial units that are unfamiliar with a network of historians. For example, the abstraction component can serve as a common language between historians and industrial units that communicate over various networks, between applications and buses, between processes on a computer, and the like.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
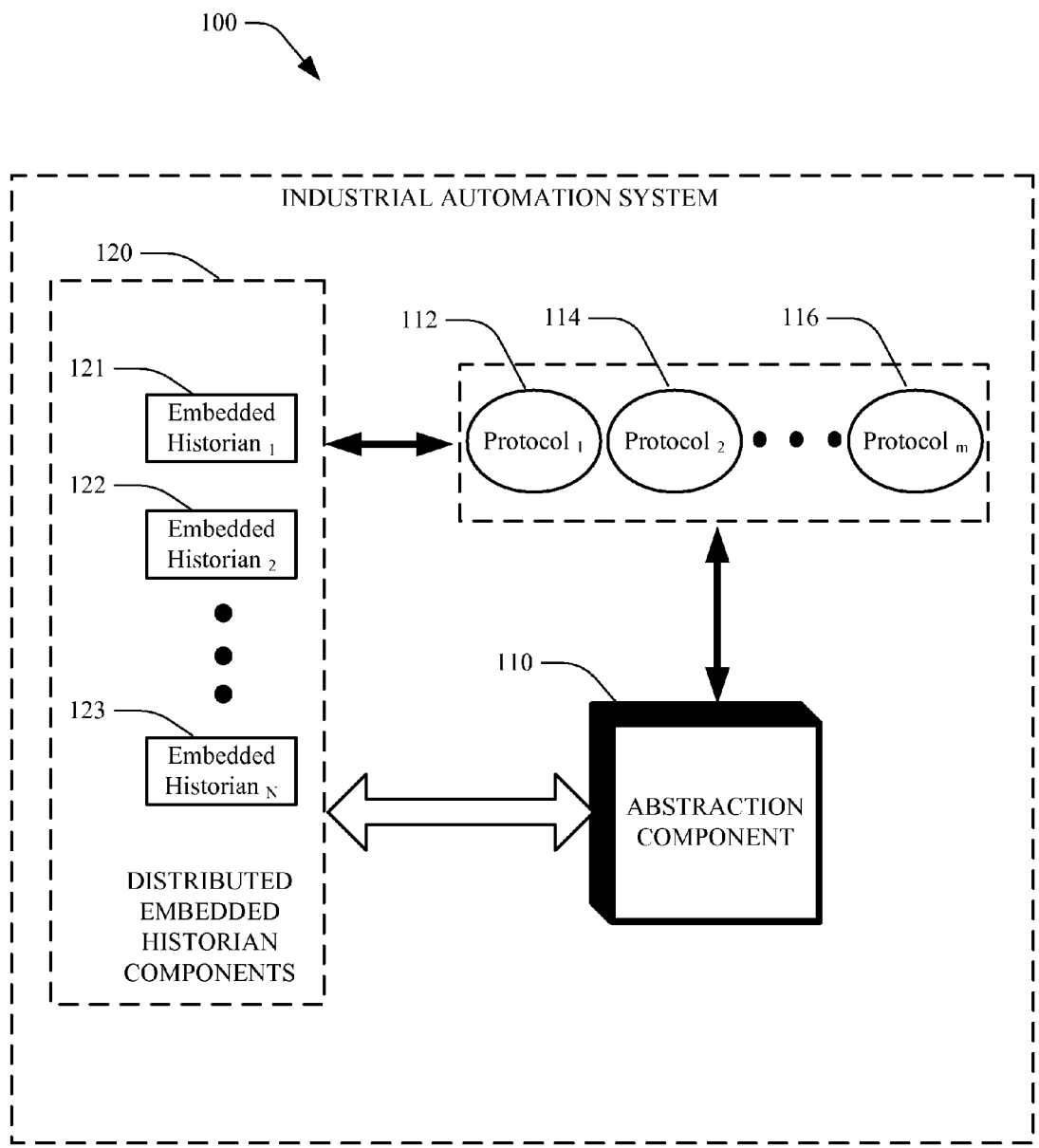
FIG. 1 is a schematic block diagram of an industrial automation system with an abstraction component that enables a historian to communicate in a plurality of protocols/languages with other devices in accordance with an aspect of the subject innovation.

FIG. 1 illustrates an abstraction component 110 that is associated with a plant embedded historian network of an industrial programmer system 100 (e.g., a network of controller devices), to facilitate communication of data between protocols 112, 114, 116 (1 thru m, where m is an integer). Such abstraction component 110 can normalize communications between historians 121, 122, 123 (1 thru N, N being an integer) and other industrial units by employing the plurality of protocols.

Accordingly, the distributed embedded historian component 120 can supply a common configuration for various data (e.g., events, command, event, alarm, scenarios, transactions, messages, and the like), and hence provide support for third party devices. The abstraction component 110 can further facilitate: Filtering, Bridging, Routing, Propagation, Transformation and Monitoring of data exchange with third party devices.

Accordingly, such an arrangement can facilitate a unification of various protocols and networks, which can further bind device models (e.g., device specific applications that communicate with the device), and/or services and also higher level protocols, to multiple historian network implementations. As part of such an abstraction, programming models can be implemented that include semantics for a locator component, and a messaging transport component.

Figure 2:
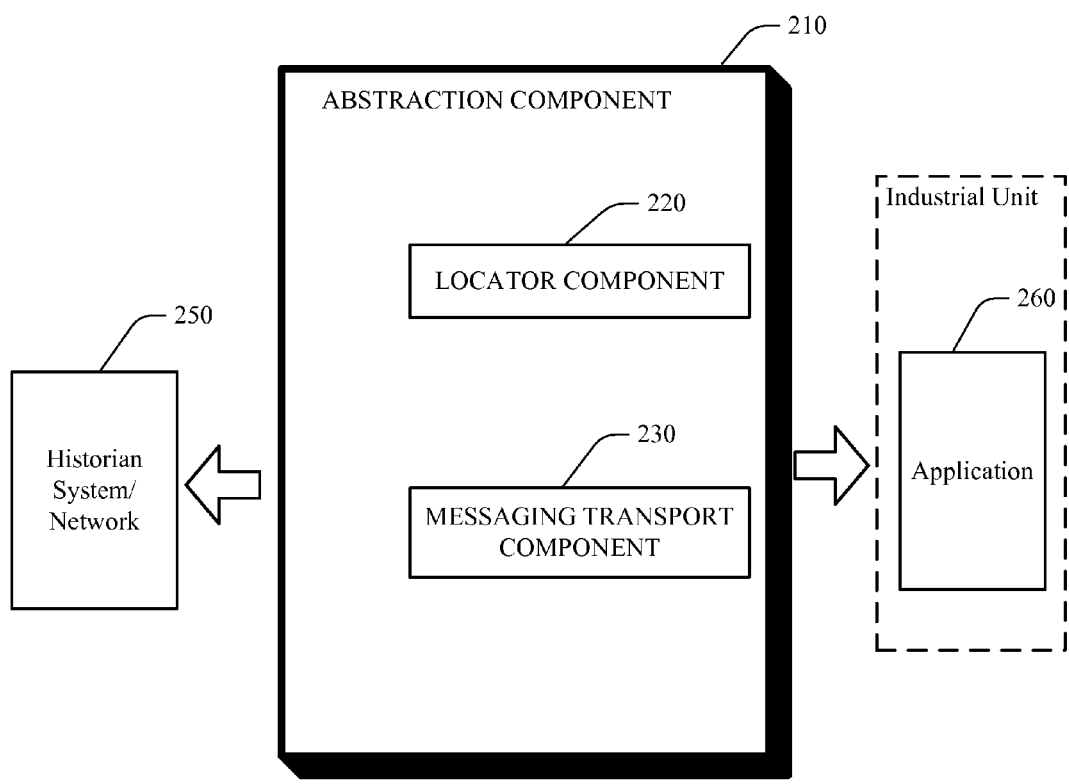
FIG. 2 illustrates an abstraction component in accordance with a particular aspect of the subject innovation that includes a locator component and a messaging transport component.

FIG. 2 illustrates an abstraction component 210 in accordance with a particular aspect of the subject innovation that includes a locator component 220 and a messaging transport component 230. Such abstraction component 210 enables a plurality of historians 250 to supply a common configuration for various data (e.g., events, command, event, alarm, scenarios, transactions, messages, and the like), and hence provide support for third party devices. Accordingly, from the application side 260 of an industrial unit, the abstraction component 210 can appear uniform—even though the abstraction component 210 can operate differently for a particular historian network system.

The locator component 220 can permit devices in communication with a historian network 250, to provide a signaling mechanism for a discovery of such devices. Moreover, the messaging transport component 230 can provide for the ability to transfer messages, such as control messages of medium priority that typically are required to transfer rapidly to maintain a substantially good control of the various devices. Accordingly, the subject innovation can facilitate interaction between an application on an industrial unit that is unfamiliar with a network of the historian, therewith. For example, the abstraction component 210 can serve as a common language between historians and industrial units that communicate over: various networks, between applications and buses, between processes on a computer, and the like.

Figure 3:
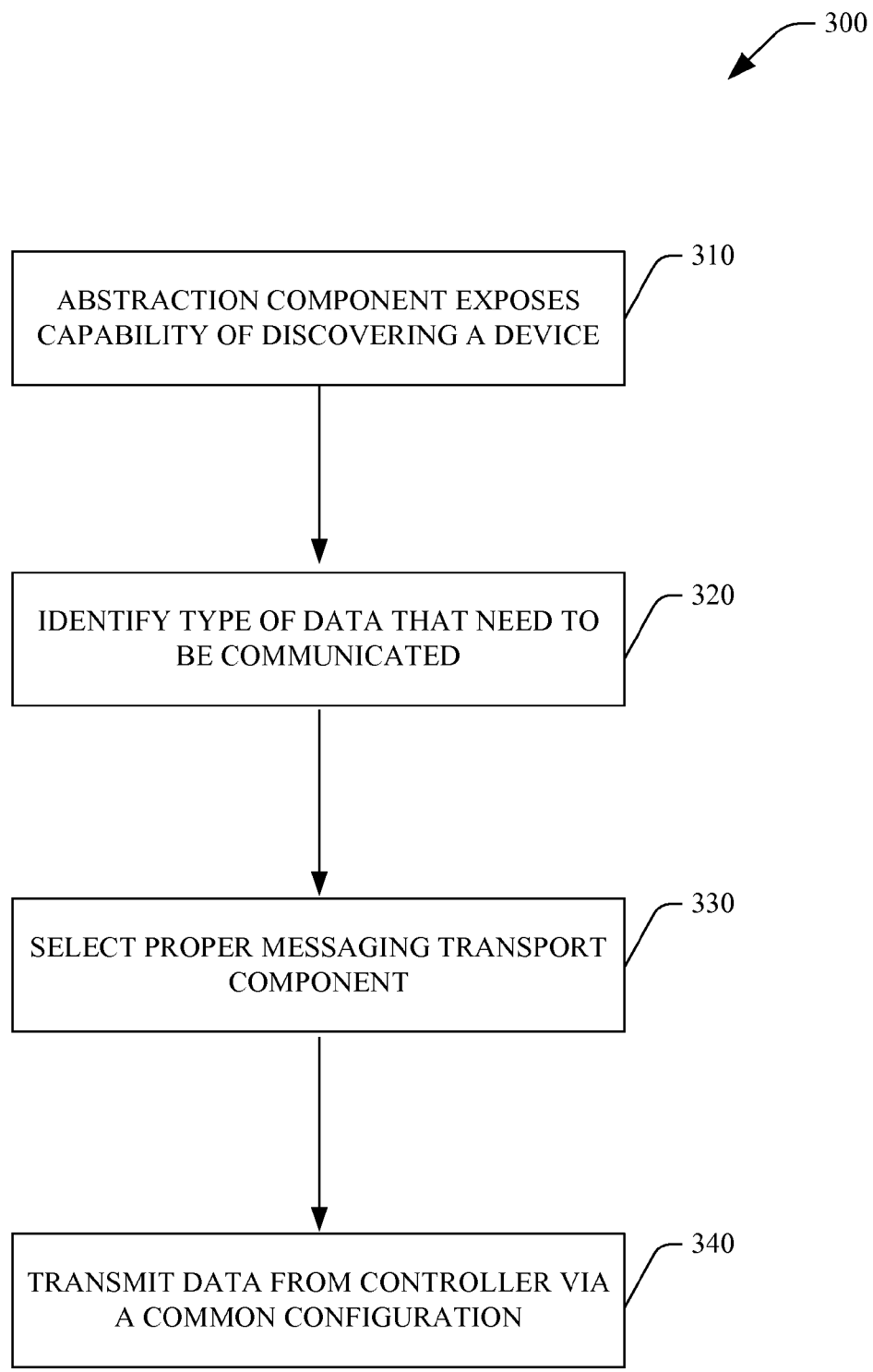
FIG. 3 illustrates a methodology of implementing an abstraction component in accordance with an aspect of the subject innovation.

FIG. 3 illustrates a methodology 300 of implementing an abstraction component in accordance with an aspect of the subject innovation. While the exemplary method is illustrated and described herein as a series of blocks representative of various events and/or acts, the present invention is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the present invention. Moreover, it will be appreciated that the exemplary method and other methods according to the invention may be implemented in association with the method illustrated and described herein, as well as in association with other systems and apparatus not illustrated or described.

The methodology 300 initiates at 310, wherein the abstraction component exposes a capability of discovering a device to be communicated with, by a historian and controller or an application associated with a third party device. For example, a string can be employed as part of addressing the device or parts thereof. Next and at 320, a determination can be made as to the type of data and/or commands, which need to be communicated between the historians and/or third party devices. At 330, a proper messaging transport component, such as message transfer, or streaming or bulk transfer, can be selected to transfer the messages to the device or parts thereof. Next, based on such selection and at 340, the historian data can be transmitted to the controller or third party devices via a common configuration.

Figure 4:
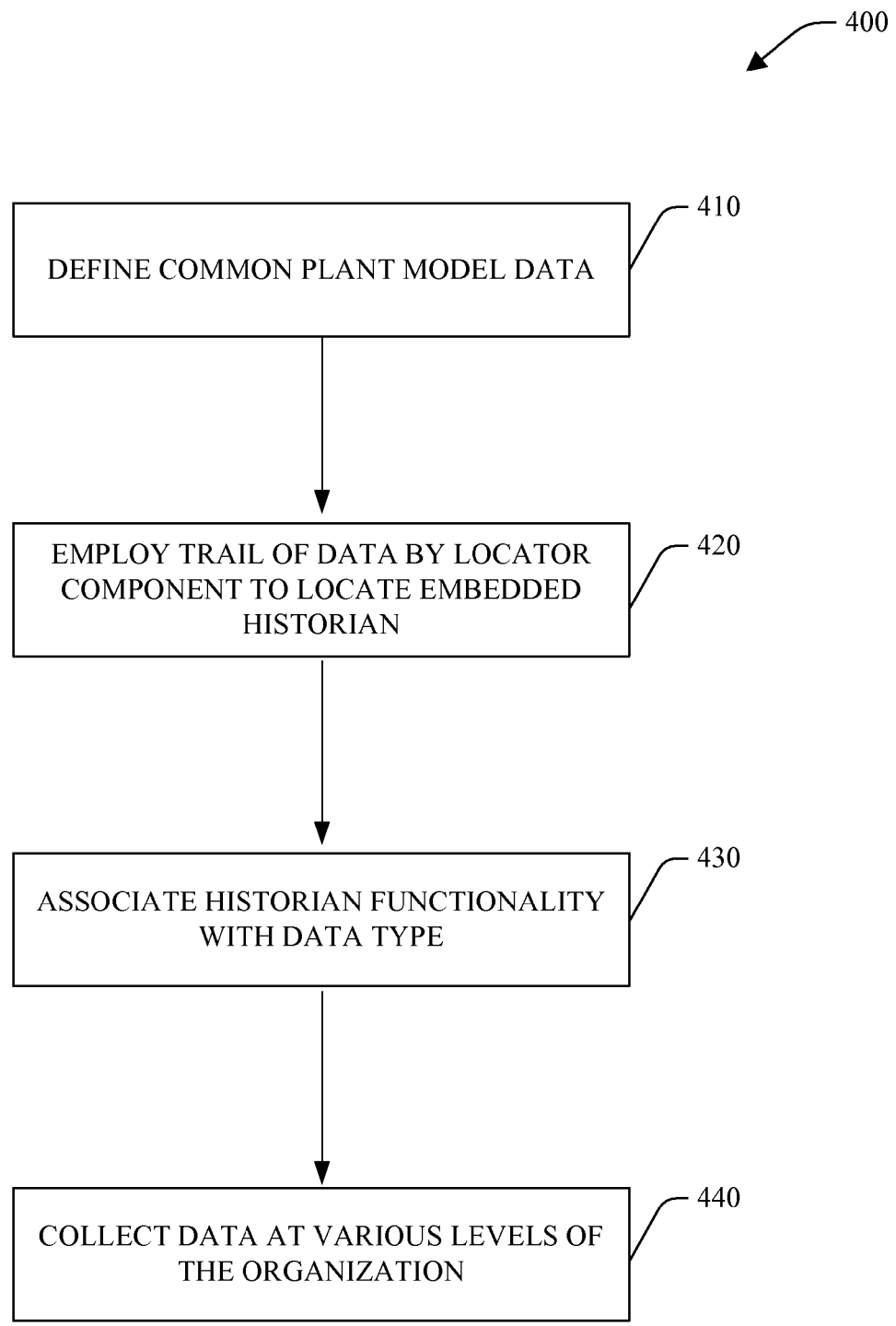
FIG. 4 illustrates a related methodology of data collection, via a plurality of embedded historians that are locatable thru the locator component, as part of an abstraction component in accordance with an aspect of the subject innovation.

FIG. 4 illustrates a related methodology 400 of data collection, via a plurality of embedded historians that are locatable thru the locator component, as part of an abstraction component in accordance with an aspect of the subject innovation. Initially, and at 410, a common organizational or plant data model is defined. Such model can supply the ability to describe the functionality of data in a system such as can be provided by metadata for example. Next and at 420, the locator component can employ trail of data to locate a desired embedded historian. Such can further include employing a directory to determine where the source or destination for a particular embedded historian data structure is located. At 430, embedded historian functionality can be associated with the common data structure, wherein the controller can specify that such data is to be collected by an embedded historian component. Similarly, data can be exposed to embedded historian components according to its metadata or other determined data context. At 440, embedded historian data is collected across various levels of an organization according to the plant data model and via the associated directory service.

Figure 5:
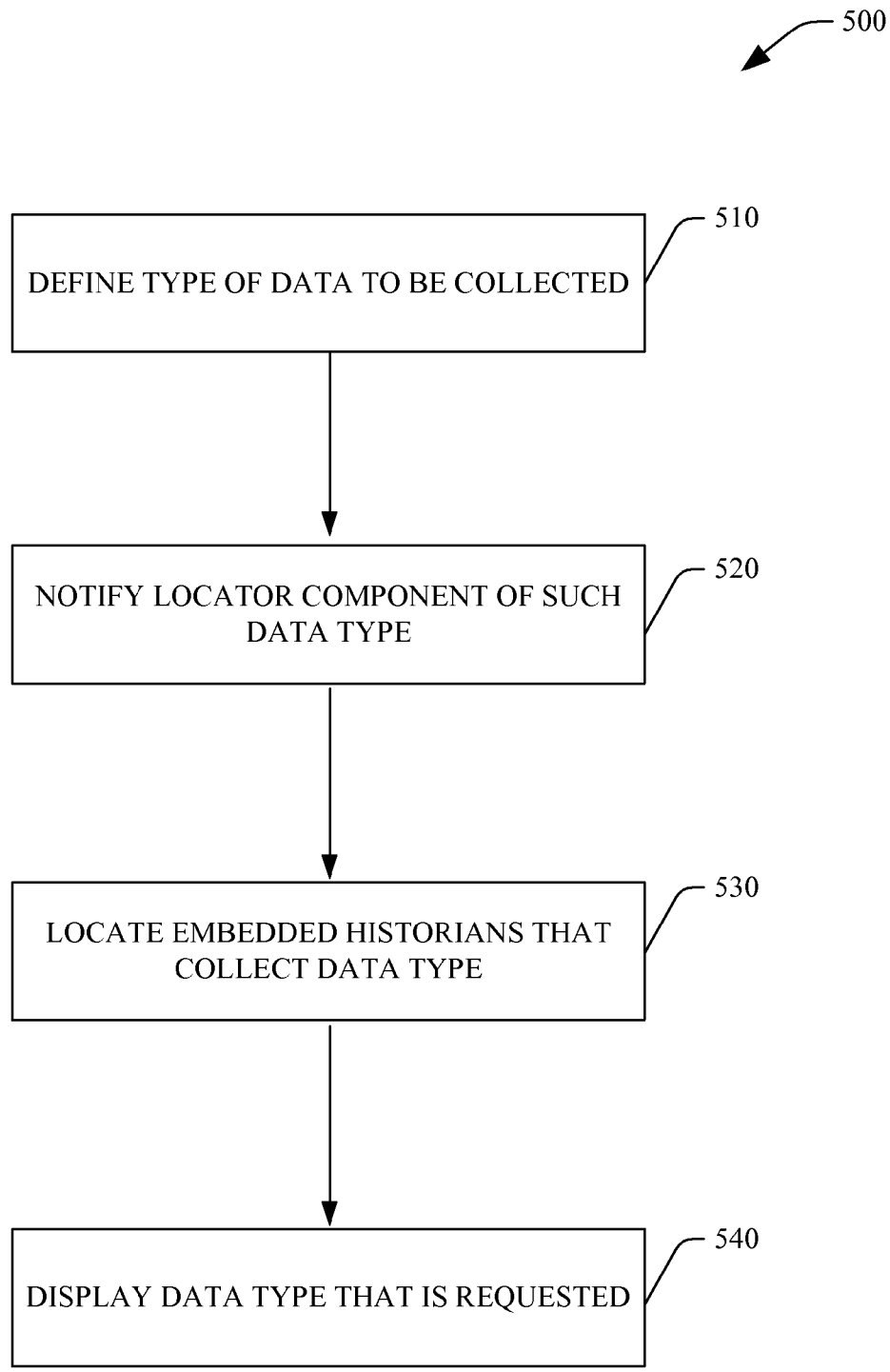
FIG. 5 illustrates a related methodology of embedded historian location and data collection in accordance with an aspect of the subject innovation.

FIG. 5 illustrates a related methodology 500 of embedded historian location and data collection in accordance with an aspect of the subject innovation. Initially and at 510, users can determine type of data to be collected. Subsequently, and at 520 the locator component is notified for collection of such data type. The locator component can then locate embedded historians that have collected or have access to a collection of such data type, at 530. Subsequently and at 540, the data can be acquired, supplied and reported to the user, such that the historians can communicate in a plurality of protocols/languages with various resources.

Figure 6:
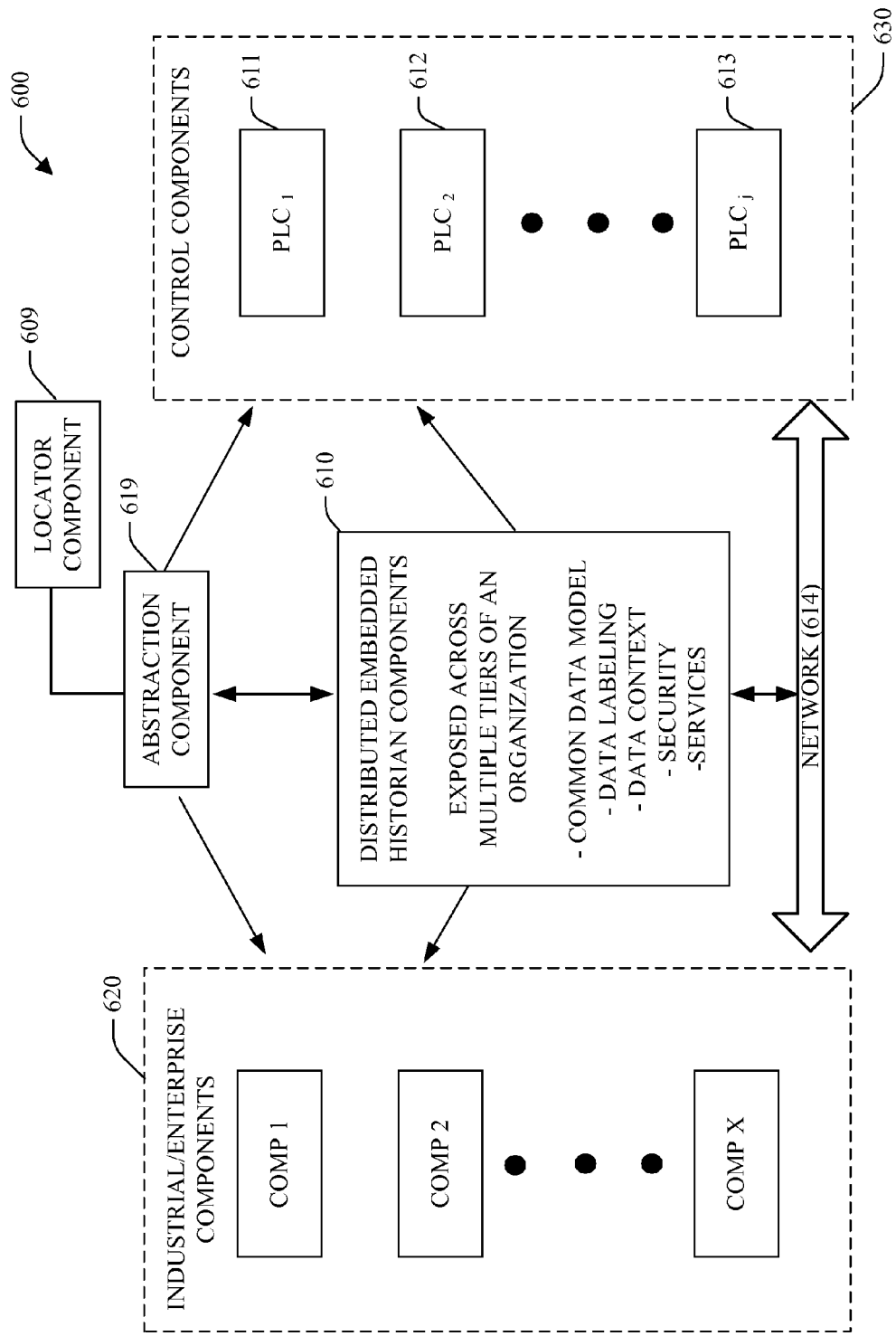
FIG. 6 illustrates a system that includes a plurality of embedded historian components operating in an organizational data model, wherein an abstraction component enables communication in a plurality of languages.

FIG. 6 illustrates a system 600 that includes a plurality of embedded historian components 610 operating in an organizational data model, wherein an abstraction component 619 enables communication in a plurality of languages. Moreover, a locator component 609 can detect embedded historians (e.g., micro historians) that are distributed on the back plane of an associated industrial network. In addition, the embedded historian components 610 can be distributed across a network 614 to provide a collective or distributed database. The locator component 609 can be part of applications running on a control unit 630, which can function as a management control center for the industrial network system.

The industrial setting or organizational enterprise 600 can employ a plurality of computers or network components that communicate across the network 614, to one or more industrial control components 630, such as for example programmable logic controllers (PLCs) 611,612, 613 (1 to j, j being an integer) or other factory components. Thus, the embedded historian components 610 can be operated as a singular or collective entity while being viewed, managed and distributed across substantially all or portions of the enterprise 620, control component 630 and/or locator component 609. For example, at the control levels 630, embedded historians can be embedded within a PLC rack to collect data, whereas higher levels at 620 can be employed to aggregate data from lower levels. Such can include higher level software components that communicate across the network 614 to collect data from lower level control components. The network 614 can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and the like. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Likewise, the industrial/enterprise 620 can include various computer or network components such as servers, clients, communications modules, mobile computers, wireless components, and the like which are capable of interacting across the network 614. Similarly, the term PLC as used herein can include functionality that can be shared across multiple components, systems, and/or networks 614. For example, one or more PLCs of the control component 630 can communicate and cooperate with various network devices across the network 614. Such can include substantially any type of control, communications module, computer, I/O device, sensor, Human Machine Interface (HMI)) that communicate via the network 614 which includes control, automation, and/or public networks. The PLC 630 can also communicate to and control various other devices such as Input/Output modules including Analog, Digital, Programmed/Intelligent I/O modules, other programmable controllers, communications modules, and the like.

The system 600 enables combining organizational information such as an organizational or hierarchical data model which represents a common model of a plant that can be based in the S88 or S95 model, and is distributed among computers of the enterprise 620 and industrial controllers 630, for example. The model can be viewed as an Organizational Data Model—a tree-like hierarchical and heterogeneous structure of organizational Units. For instance, respective Organizational Units can include other Organizational Units. Organizational Units can be either physical locations (e.g., Site, Area) or logical grouping node or collection (e.g., Enterprise as a collection of Sites). The nodes in the organizational hierarchy or model can have associated items representing the plant's production and control equipment, tags, backing tags (e.g., Alarm & Event and the like), programs, equipment phases, I/O devices, and other application related entities. These organizational units thus can form an application view of the user's system.

A typical system 600 can assign the upper levels of the hierarchy such as an Enterprise node and site to a computer system and the lower levels such as area, line, cell and machine can be contained in multiple industrial controllers 630; each of which can include components that are members of one or more organization units such as area or area model. Moreover, an organization unit can contain components from one or more controllers. The embedded historian component 610 can be positioned at various levels of the enterprise 620 and/or control 630; and can also further be integrated therein and scaled according to system data collection requirements. Such organizational model enables embedded historian components 610 to locate data of interest for collection purposes and to readily adapt and become integrated within the larger system 600.

Adaptability within the system 600 can be facilitated by data having additional information such as metadata that identifies the purpose of the data. Such metadata can further be employed by the locator component 609 to identify a micro-historian. For example, the locator component 609 can employ a trail of metadata to identify the embedded historians and relevant historian data for collection Accordingly, one form of data can identify itself as a control tag that has been marked or labeled via metadata to indicate its significance for data collection purposes. Another type of label or metadata can indicate security information that is being distributed throughout the system 600. Furthermore, other type of data can indicate that an alarm condition or an event has occurred within the system and thus, a respective embedded historian component should capture such alarm or event. In general, the organizational model enables embedded historian components 610 to receive functionality or data context from the system 600 and to expose its respective functionality to the system via the model. For example, context allows embedded historian components to such auto configuration routines where one or more components of the embedded historian architecture can be automatically discovered and configured onto a respective system. Hence, the embedded historian components 610 and the locator component 609 can be automatically integrated within the system 600, to further facilitate scaling of the system as data conditions change.

In a related aspect, such scaling can include the ability of one or more components of an organization to collaborate, and provide an overall scheme for historical data collection. Such can include having lower level PLCs or factory components collecting data and sharing this data with higher levels of the organization. If one or more of the levels become overloaded with the data collection process, historian functionality can be shifted between levels (upwards or downwards) to more effectively employ system-wide resources in an efficient manner. For instance, communications between levels can allow sharing of data collection responsibilities between one or more levels of the enterprise from the very lowest levels through the higher levels of the organizational hierarchy.

For example, the lowest level entity can have sufficient memory for data collection of desired embedded historian or archived information. If such memory resources are consumed, messaging capabilities throughout the hierarchy can subsequently take over to distribute storage responsibilities from one layer to another via suitable network messages (wireless or wired) that communicate data from one level to another. It is to be appreciated that tiers of an organization can collaborate in many combinations. Thus, a high level tier could collaborate with a low level tier or collaboration can take place between multiple tiers if desired such as between higher levels, intermediate levels, and lower levels of an organization.

The locator component 609 can identify embedded historians (e.g., micro-historians), and notify them to collect various data types. The locator component 609 can subsequently locate embedded historians that have collected or have access to a collection of such data type. Next, the data can be acquired, supplied and reported to the user via a plurality of interfaces. Such interfaces can be supplied to manipulate the embedded historian components 610 and organizational data model; such as a Graphical User Interface (GUI) to interact with the model or other components of the hierarchy; e.g., as any type of application that sends, retrieves, processes, and/or manipulates factory or enterprise data, receives, displays, formats, and/or communicates data, and/or facilitates operation of the enterprise 620 and/or PLCs 630. For example, such interfaces can also be associated with an engine, server, client, editor tool or web browser although other type applications can be utilized.

Figure 7:
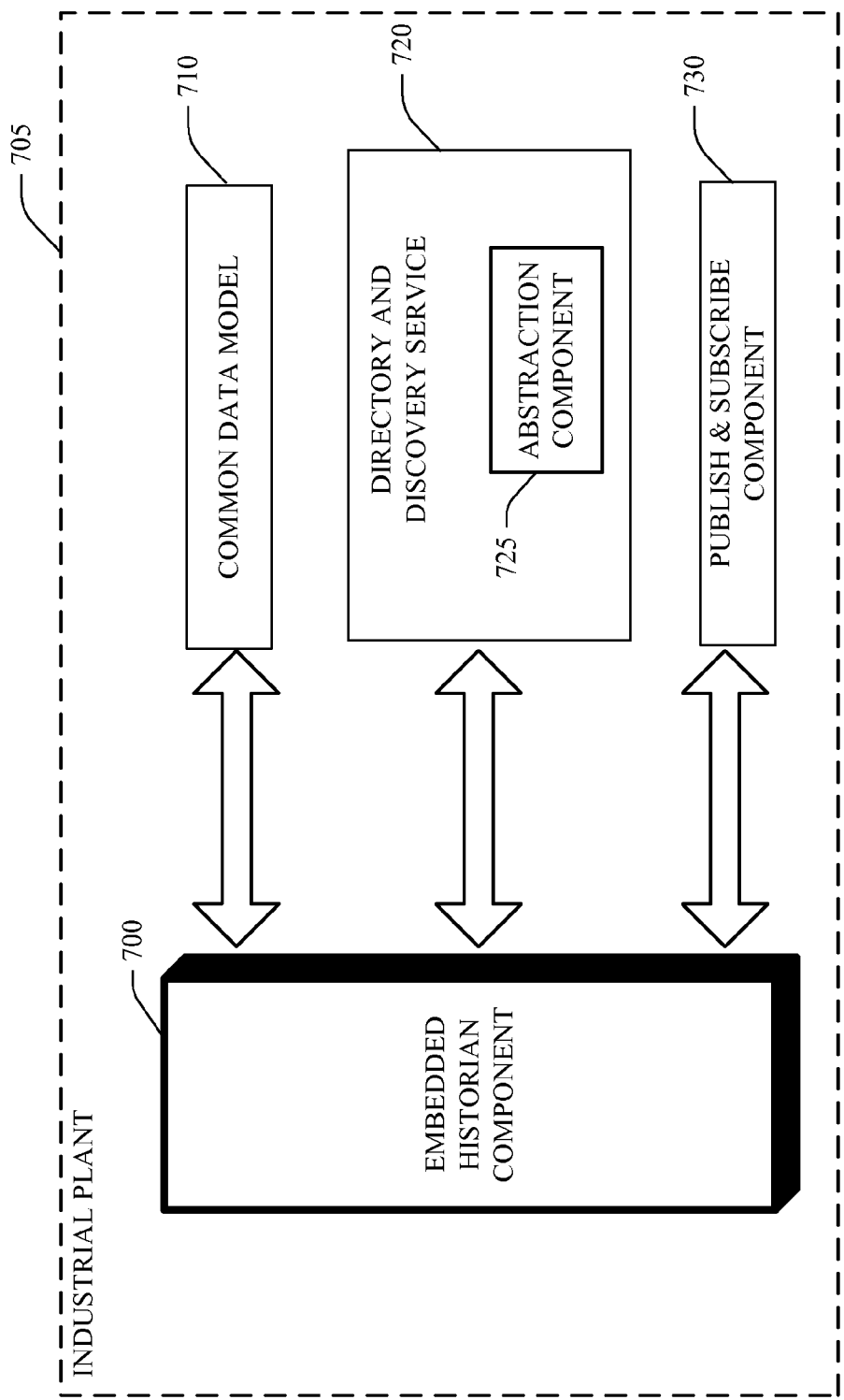
FIG. 7 illustrates an abstraction component that is operatively connected to embedded historian network/embedded historians in accordance with an aspect of the subject innovation.

FIG. 7 illustrates an abstraction component 725 that is operatively connected to embedded historian network/embedded historians 700 in accordance with an aspect of the subject innovation. The industrial setting 705 can employ a hierarchical data model with various level; e.g., enterprise level, site level (factory represented within a data packet), area level (an area within the factory associated with the data); line level (a line associated with particular data), a work-cell level (that indicates a work-cell associated with the data) and the like. For example by employing a nested, hierarchical data model, embedded historian components 700 can readily become aware of data associated therewith. Furthermore, such hierarchy can further be customized by users to obtain increased granularity within the hierarchy. The common plant model can enable the embedded historian component 700 to determine data contexts in an automated manner. The common data model 710 allows data to be marked or labeled via metadata for example to both expose embedded historian functionality to a system and/or to allow the embedded historian component 700 to be automatically integrated within the system according to data that is exposed to the embedded historian component. For example, one such labeling can pertain to security, and typically can affect substantially all components in the system associated with the common model 710.

The abstraction component 725 can be associated with a directory and discovery service. Such an arrangement enables the embedded historian component 700 to locate other embedded historian components in the system and to receive/expose historian data to other system components. This can include a network directory that determines physical addresses from logical names and vice versa, for example. Moreover, the publish and subscribe component 730 can provide subscription functionality to the embedded historian component 700, wherein data collection efficiency of the system can be enhanced. For example, the publish and subscribe component 730 of the system 705 allows data to be published or generated when a change in the data has been detected. Thus, the embedded historian component 700 can subscribe to such change events and thus only record data when a change has occurred which reduces the amount of data to be stored. Furthermore, the abstraction component 725 can facilitate a unification of various protocols and networks, which can further bind device models (e.g., device specific applications that communicate with the device), and/or services and also higher level protocols, to multiple bus implementations. Additionally, a polling/publication arrangement can also be employed wherein the embedded historians (e.g., micro-historians) identify themselves to the abstraction component 725 upon occurrence of a predetermined event, and/or periodically.

Figure 8:
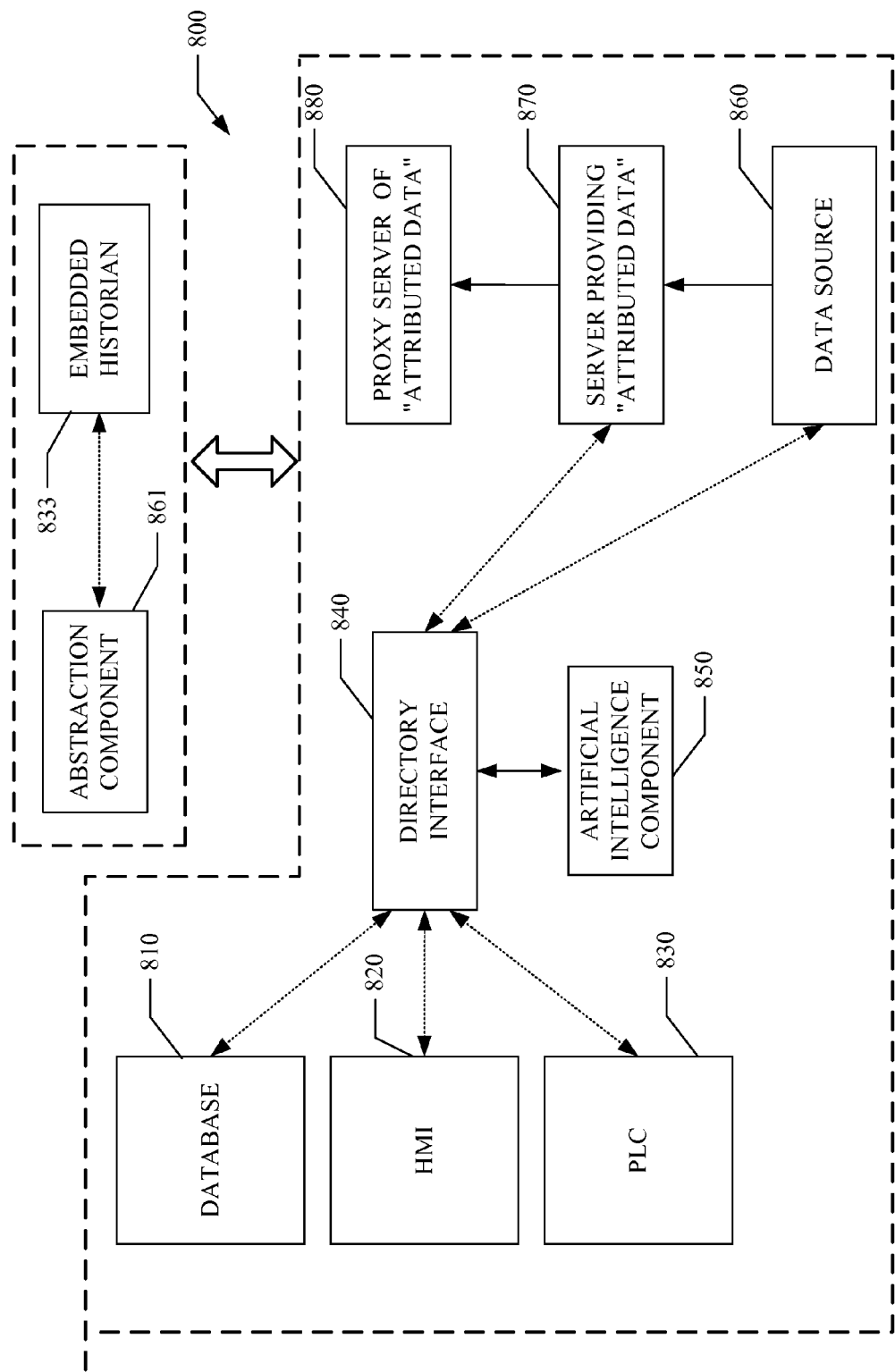
FIG. 8 illustrates an exemplary industrial automation network that can implement an abstraction component in accordance with an aspect of the subject innovation.

FIG. 8 illustrates an exemplary industrial automation network that employs an embedded historian component 833, to enable high speed data collection (e.g., real time) from the industrial setting 800, which can include a database 810, a human machine interface (HMI) 820 and a programmable logic controller (PLC) 830, and a directory interface 840. The directory interface 840 can further associate with an Artificial Intelligence (AI) component 850 to facilitate efficient identification of desired data within a particular network/application. The directory interface 840 can be employed to provide data from an appropriate location such as the data source 860, a server 870 and/or a proxy server 880. Accordingly, the directory interface 840 can point to a source of data based upon role and requirements (needs) of a requester (e.g., database 810, HMI 820, PLC 830, and the like.) The database 810 can be any number of various types such as a relational, network, flat-file or hierarchical systems. Typically, such databases can be employed in connection with various enterprise resource planning (ERP) applications that can service any number of various business related processes within a company. For example, ERP applications can be related to human resources, budgeting, forecasting, purchasing and the like. In this regard, particular ERP applications may require data that has certain desired attributes associated therewith. Thus, in accordance with an aspect of the subject invention, the directory interface 840 can provide data to the database 810 from the server 870, which provides data with the attributes desired by the database 810.

As illustrated in FIG. 8, the embedded historian 833 can leverage directory interface 840 and other re-locatable information services or software services to locate other embedded historian components and their configurations. In addition, the abstraction component 861 can further detect embedded historians 833 that are distributed on the back plane of an industrial network. Accordingly, the abstraction component 861 can supply a common configuration for various data (e.g., events, command, event, alarm, scenarios, transactions, messages, and the like), and hence provide support for third party devices. The abstraction component 861 can also facilitate: Filtering, Bridging, Routing, Propagation, Transformation and Monitoring of data exchange with third party devices. Moreover, such can facilitate a unification of various protocols and networks, which can further bind device models (e.g., device specific applications that communicate with the device), and/or services and also higher level protocols, to multiple bus implementations.

Moreover, the HMI 820 can employ the directory interface 840 to point to data located within the system 800. The HMI 820 can be employed to graphically display various aspects of a process, system, factory, etc. to provide a simplistic and/or user-friendly view of the system. Accordingly, various data points within a system can be displayed as graphical (e.g., bitmaps, jpegs, vector based graphics, clip art and the like) representations with desired color schemes, animation, and layout.

The HMI 820 can request data to have particular visualization attributes associated with data in order to easily display such data thereto. For example, the HMI 820 can query the directory interface 840 for a particular data point that has associated visualization attributes. The directory interface 840 can determine the proxy server 880 contains the attributed data point with the desired visualization attributes. For instance, the attributed data point can have a particular graphic that is either referenced or sent along with the data such that this graphic appears within the HMI environment instead of or along with the data value.

As explained earlier, the PLC 830 can be any number of models such as Allen Bradley PLC5, SLC-500, MicoLogix, and the like. The PLC 830 is generally defined as a specialized device employed to provide high-speed, low-level control of a process and/or system. The PLC 830 can be programmed using ladder logic or some form of structured language. Typically, the PLC 830 can utilize data directly from a data source (e.g., data source 860) that can be a sensor, encoder, measurement sensor, switch, valve and the like. The data source 860 can provide data to a register in a PLC and such data can be stored in the PLC if desired. Additionally, data can be updated (e.g., based on a clock cycle) and/or output to other devices for further processing.

Figure 9:
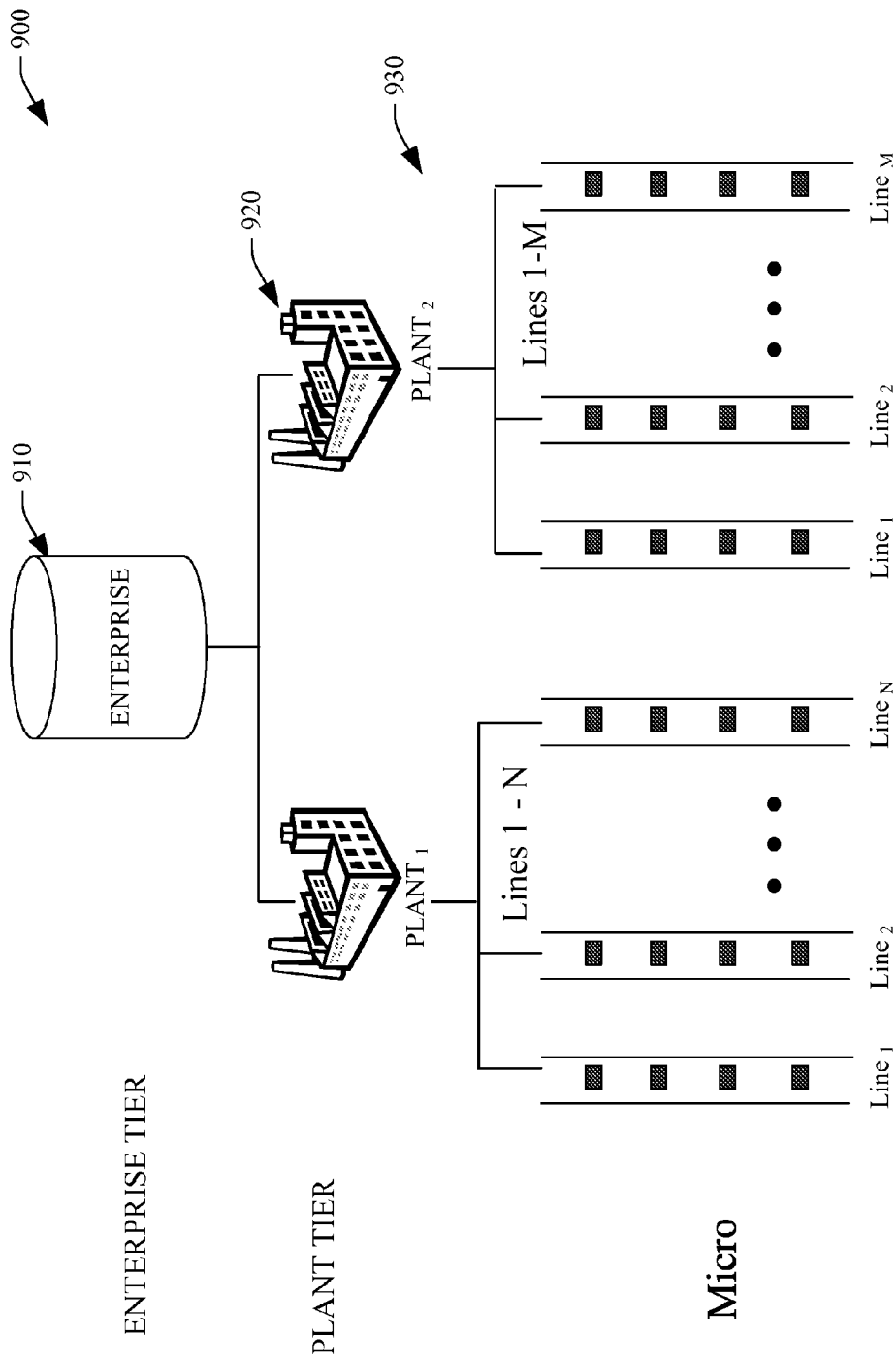
FIG. 9 illustrates an exemplary multi-tiered and distributed historian system, in accordance with an aspect of the subject innovation.

FIG. 9 illustrates an exemplary multi-tiered and distributed historian system 900, in accordance with an aspect of the subject innovation. The exemplary system 900 illustrates three tiered historian level, wherein the highest data collection tier is illustrated and can be referred to as the enterprise tier 910. This tier aggregates data collected from lower level tiers such as from a plant tier 920 and a micro or embedded tier 930. As illustrated, the tiers 910 and 920 can include archival or permanent storage capabilities. In the system 900, data can be collected from two plants at the tier 920, and from a plurality of historian components at tier 930. It is to be appreciated that such an arrangement is exemplary in nature, and other arrangements are well within the realm of the subject innovation.

Typically, the system 900 can be viewed as a Distributed Historian that spans machines, plants, and enterprises. At level 930, the historian collects data at the rack level and is coupled to Common Plant Data Structure described above. Such can include collecting process & discrete data, alarms & events in a single archive if desired. Other aspects can include auto-discovery of data and context from controllers in local chassis including store/forward data capabilities from local buffers. Data can be collected without polling, having a low communications bandwidth. The plant level 920 aggregates data from Micro or rack-embedded Historians and/or other data sources (e.g., Live Data source). Such can include plant-level querying, analytics, reporting while efficiently storing, retrieving, and managing large amounts of data. This level can also auto-discover data and data model context from Micro Historians located at level 930. Other features of the system 900 can include analysis components, logical units, components for interaction with report elements, embeddable presentation components, replication of configuration, storage, archiving, data compression, summarization/filtering, security, and scalability.

Figure 10:
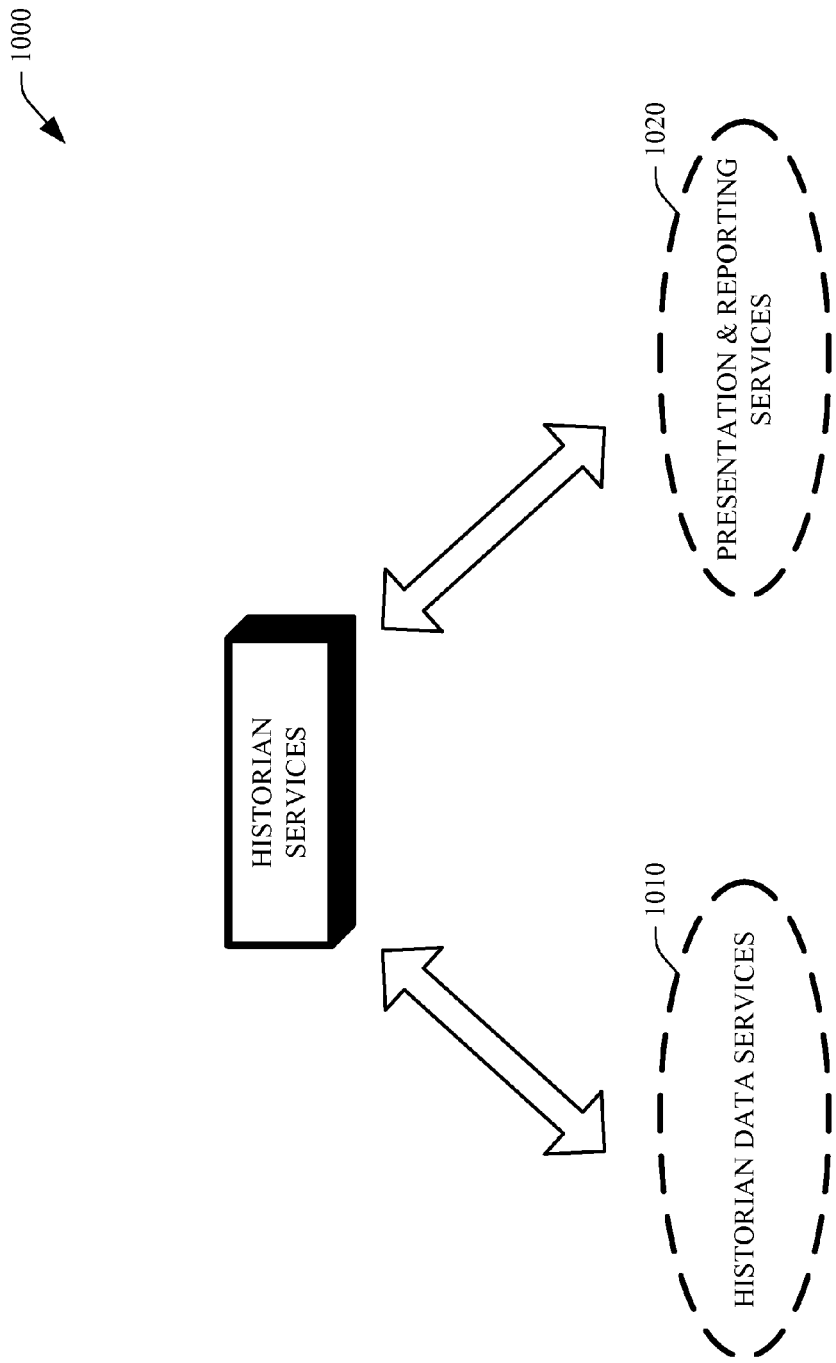
FIG. 10 illustrates historian services that include historian data services and presentation and reporting services.

FIG. 10 illustrates historian services 1000 that include historian data services 1010 and presentation and reporting services 1020. Historian Data Services 1010 (HDS) can supply generic, customizable services for collecting and storing data with plant model-defined context. This can include configuration of data to be collected e.g., tags, data context, alarms, events, diagnostics, SOE data and configuration of data to be forwarded to a higher level. Collection of data can be from disparate sources including storage of data, retrieval of data, and management of data. Management of data collected by/residing in other data stores (e.g., higher-level business systems, 3rd party products) can be processed by the respective applications. The presentation and reporting services 1020 (PRS) can supply generic, customizable services for collating and presenting data in a common plant model-defined context. This can include access to stored data, analysis/calculators and query mechanisms, and embeddable, interactive presentation components (e.g., text, charts, SPC). The service 1010 can generate reports with various means of presentation/distribution (e.g., web, email) having export capabilities to standard formats (e.g., XML, Excel).

Figure 11:
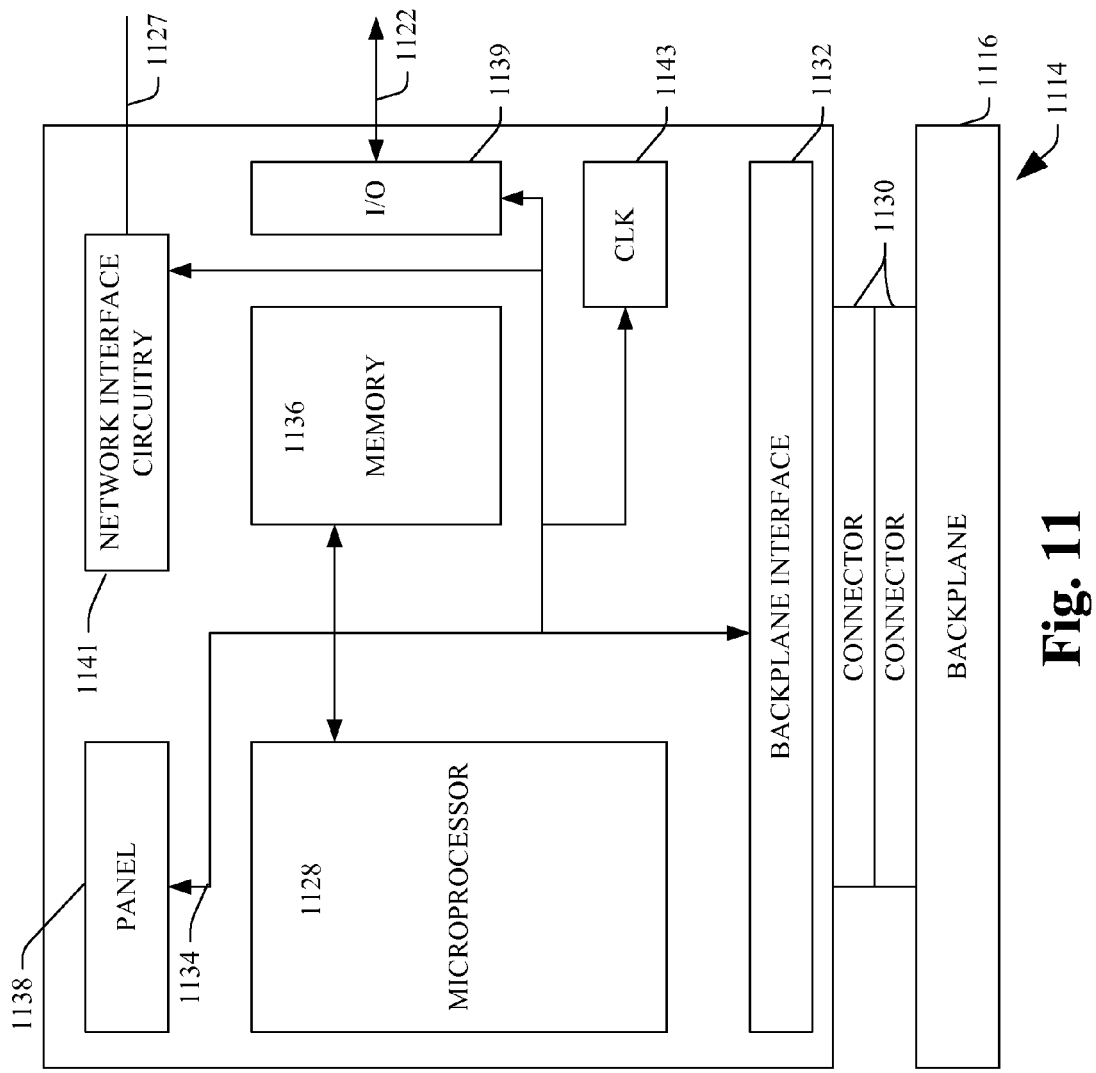
FIG. 11 illustrates an exemplary environment that can employ an abstraction component that identifies embedded historians in accordance with an aspect of the subject innovation.

FIG. 11 illustrates an exemplary environment that can employ an abstraction component that identifies embedded historians in accordance with an aspect of the subject innovation. As illustrated, each functional module 1114, is attached to the backplane 1116 by means of a separable electrical connector 1130 that permits the removal of the module 1114 from the backplane 1116 so that it may be replaced or repaired without disturbing the other modules 1114. The backplane 1116 provides the module 1114 with both power and a communication channel to the other modules 1114. Local communication with the other modules 1114 through the backplane 1116 is accomplished by means of a backplane interface 1132 which electrically connects the backplane 1116 through connector 1130. The backplane interface 1132 monitors messages on the backplane 1116 to identify those messages intended for the particular module 1114, based on a message address being part of the message and indicating the message destination. Messages received by the backplane interface 1132 are conveyed to an internal bus 1134 in the module 1114.

The internal bus 1134 joins the backplane interface 1132 with a memory 1136, a microprocessor 1128, front panel circuitry 1138, I/O interface circuitry 1139 and communication network interface circuitry 1141. The microprocessor 1128 can be a general purpose microprocessor providing for the sequential execution of instructions included within the memory 1136 and the reading and writing of data to and from the memory 1136 and the other devices associated with the internal bus 1134. The microprocessor 1128 includes an internal clock circuit (not shown) providing the timing of the microprocessor 1128 but may also communicate with an external clock 1143 of improved precision. This clock 1143 may be a crystal controlled oscillator or other time standard including a radio link to an external time standard. The precision of the clock 1143 may be recorded in the memory 1136 as a quality factor. The panel circuitry 1138 includes status indication lights such as are well known in the art and manually operable switches such as for locking the module 1114 in the off state.

The memory 1136 can comprise control programs or routines executed by the microprocessor 1128 to provide control functions, as well as variables and data necessary for the execution of those programs or routines. For I/O modules, the memory 1136 may also include an I/O table holding the current state of inputs and outputs received from and transmitted to the industrial controller 1110 via the I/O modules 1120. The module 1114 can be adapted to perform the various methodologies of the innovation, via hardware configuration techniques and/or by software programming techniques.

It is noted that as used in this application, terms such as "component," "hierarchy," "model," and the like are intended to refer to electromechanical components, and/or a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith.

What has been described above includes various exemplary aspects. It is, of course, not possible to describe every conceivable combination of components or methodologies for purposes of describing these aspects, but one of ordinary skill in the art may recognize that many further combinations and permutations are possible. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the innovation. In this regard, it will also be recognized that the innovation includes a system as well as a computer-readable medium having computer-executable instructions for performing the acts and/or events of the various methods of the innovation. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An industrial automation system, comprising:
    a plurality of embedded historians that collect data associated with the industrial automation system, the plurality of embedded historians are distributed among a plurality of tiers of an organizational hierarchy data model; and
    at least one processor that executes at least an abstraction component stored on at least one non-transitory computer readable medium, wherein the abstraction component normalizes communications between the embedded historians and one or more industrial units within the industrial automation system by employing a plurality of protocols.

2. The industrial automation system of claim 1, wherein the abstraction component further comprising a locator component that detects at least one of the plurality of embedded historians or the one or more industrial units.

3. The industrial automation system of claim 2, wherein the organizational hierarchy data model includes nodes that represent the one or more industrial units associated with the industrial automation system.

4. The industrial system of claim 3, wherein the organizational hierarchy data model facilitates determining data context for data collection.

5. The industrial system of claim 3, the organizational hierarchy data model employs metadata for identification of the plurality of embedded historians to the locator component.

6. The industrial automation system of claim 2, wherein the locator component is operatively connected to a directory service to facilitate discovery service.

7. The industrial system of claim 2, further comprising a publish and subscribe component that identifies the plurality of embedded historians to the locator component.

8. The industrial automation system of claim 1, wherein the abstraction component further comprising a message transport component that enables transfer of messages between at least one application on the one or more industrial units, which is unfamiliar with a protocol employed by the plurality of embedded historians.

9. The industrial automation system of claim 1 further comprising an artificial intelligence component that facilitates identification of the data collected by the plurality of embedded historians.

10. The industrial automation system of claim 1 further comprising a Human Machine Interface (HMI) to graphically display a view of the industrial automation system.

11. The industrial automation system of claim 1 further comprising a graphical user interface (GUI) that forms an application view of a historian data collection system.

12. The industrial system of claim 1, wherein the plurality of embedded historians are associated with at least one of a controller, a module in a chassis, a server, a sensor, or a factory component.

13. A method of locating embedded historians within an industrial plant comprising:
    collecting data via a plurality of embedded historians exposed across various levels of an organization; and
    employing at least one processor to execute computer executable instructions stored on at least one non-transitory computer readable medium for normalizing communication between the plurality of embedded historians and one or more industrial units employing a plurality of protocols by supplying a common configuration for different types of data.

14. The method of claim 13 further comprising identifying a data type for collection by the plurality of embedded historians.

15. The method of claim 14, further comprising detecting an embedded historian that collects the data type via a locator component.

16. The method of claim 15 further comprising defining a common organizational data model that represents the various levels of the organization associated with the industrial plant.

17. The method of claim 16 further comprising employing a directory to track source of data.

18. The method of claim 16 further comprising collecting historian data across various levels of the industrial plant.

19. The method of claim 15 further comprising employing metadata to facilitate a trail to the embedded historian.

20. An industrial controller system comprising:
   hardware means for processing;
   non-transitory means for storing computer executable instructions that, in response to execution by the means for processing, implement:
      means for collecting data related to an industrial process across at least two disparate levels of the industrial controller system;
      means for locating the means for collecting;
      means for supplying a common configuration for different type of data to at least one industrial unit; and
      means for abstracting communication between the means for collecting and the at least one industrial unit.

* * * * *